United States Patent
Aida et al.

(10) Patent No.: US 7,746,586 B2
(45) Date of Patent: Jun. 29, 2010

(54) MEDIA DRIVE, PROCESSING METHOD FOR RECORDING DATA ONTO A MEDIUM, PROCESSING METHOD FOR DATA READ FROM A MEDIUM, AND METHOD FOR CONTROLLING A PROCESS FOR READING DATA FROM A MEDIUM

(75) Inventors: Toru Aida, Kanagawa (JP); Minoru Hashimoto, Kanagawa (JP); Toshiroh Unoki, Kanagawa (JP); Mariko Kado, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 141 days.

(21) Appl. No.: 12/217,265

(22) Filed: Jul. 1, 2008

(65) Prior Publication Data
US 2008/0259487 A1 Oct. 23, 2008

Related U.S. Application Data

(62) Division of application No. 10/950,232, filed on Sep. 23, 2004, now Pat. No. 7,660,062.

(30) Foreign Application Priority Data

Oct. 1, 2003 (JP) ............................. 2003-342917

(51) Int. Cl.
G11B 27/36 (2006.01)
(52) U.S. Cl. .................. 360/31; 360/75; 369/53.16; 369/53.35
(58) Field of Classification Search ............... 369/47.14, 369/53.12–53.18, 53.35, 53.36; 360/69, 360/75, 53, 31, 27, 59
See application file for complete search history.

(56) References Cited

U.S. PATENT DOCUMENTS

| 4,067,044 A | 1/1978 | Maeda et al. |
| 5,432,768 A | 7/1995 | Terashima et al. |

(Continued)

FOREIGN PATENT DOCUMENTS

JP 2002-268829 9/2002

OTHER PUBLICATIONS

Office Action for U.S. Appl. No. 10/950,232, dated Jul. 18, 2008.

(Continued)

*Primary Examiner*—Thang V Tran
(74) *Attorney, Agent, or Firm*—Townsend and Townsend and Crew LLP; Patrick Duncan (57) ABSTRACT

Embodiments of the invention control a recovery procedure effectively in accordance with write conditions. In one embodiment, the data to be written into a sector includes not only user data but also recording condition data, which indicates the temperature prevalent during a write. If a data read is not accurately performed, a recovery procedure is executed. If a data read is accomplished by a retry and the temperature prevalent during a write is lower than predetermined, it is concluded that the employed medium is nondefective. Thus, the read data is rewritten into the same sector without being stored in a spare area. This prevents the spare area from being unnecessarily consumed.

8 Claims, 9 Drawing Sheets

U.S. PATENT DOCUMENTS

| | | |
|---|---|---|
| 5,455,717 A | 10/1995 | Van Doorn et al. |
| 5,739,973 A | 4/1998 | Echigo |
| 5,815,730 A | 9/1998 | Kim |
| 5,848,045 A | 12/1998 | Kirino et al. |
| 5,963,519 A | 10/1999 | Kim |
| 6,292,321 B1 | 9/2001 | Miyake |
| 6,362,928 B2 | 3/2002 | Hamai et al. |
| 6,678,220 B1 | 1/2004 | Saga |
| 6,873,584 B2 * | 3/2005 | Imada et al. ............. 369/53.16 |
| 6,894,965 B2 | 5/2005 | Furumiya et al. |
| 6,927,931 B2 | 8/2005 | Harata et al. |
| 6,970,315 B2 | 11/2005 | Tanimoto |
| 6,972,920 B2 | 12/2005 | Kim et al. |
| 7,031,091 B2 | 4/2006 | Ichihara et al. |
| 7,036,066 B2 | 4/2006 | Weibel et al. |

OTHER PUBLICATIONS

Office Action for U.S. Appl. No. 10/950,232, dated Jan. 21, 2009.
Office Action for U.S. Appl. No. 10/950,232, dated Jul. 21, 2009.
Notice of Allowability for U.S. Appl. No. 10/950,232, dated Oct. 16, 2009.

* cited by examiner

Recording condition data table 304

| Temperature data (°C) | Level |
|---|---|
| 0 or lower | 0 |
| 0 to 5 | 1 |
| 5 to 10 | 2 |
| 10 to 20 | 3 |
| 20 to 30 | 4 |
| 30 to 40 | 5 |
| 40 to 50 | 6 |
| Higher than 50 | 7 |

MEDIA DRIVE, PROCESSING METHOD FOR RECORDING DATA ONTO A MEDIUM, PROCESSING METHOD FOR DATA READ FROM A MEDIUM, AND METHOD FOR CONTROLLING A PROCESS FOR READING DATA FROM A MEDIUM

BACKGROUND OF THE INVENTION

The present invention relates to a media drive, a processing method for recording data onto a medium, a processing method for data read from a medium, and a method for controlling a process for reading data from a medium, and more particularly to a magnetic disk recording/reproducing apparatus.

Various devices using optical disks, magnetic tapes, and other media are known as information recording/reproducing apparatus devices. Among others, a hard disk drive is now widely used as a storage device for use with a computer and considered an essential storage device for a present-day computer system. Due to its excellent characteristics, the hard disk drive have found an increasingly wide range of applications, including not only a computer but also a motion picture recording/reproducing apparatus, a car navigation system, a removable memory for use with a digital camera, and the like.

A magnetic disk or other recording medium for use with a hard disk drive contains a plurality of concentric tracks. Each track is divided into a plurality of sectors. Each sector stores the sector's address information and user data. A head of the hard disk drive accesses a target sector in accordance with the sector's address information so that data can be written into the sector and read from the sector.

In a process for reading a medium, for instance, data may not accurately be read at all times. If the hard disk drive cannot accurately read data in a normal read mode, it initiates a recovery procedure. The recovery procedure changes a parameter for a read process and then retries a read. The retry operation is repeated while the parameter value is varied. The retry operation terminates if the data cannot accurately be read after it has been repeated a predetermined number of times. The parameter to be changed may be, for instance, a head position, an amplifier gain for A/D conversion on a channel, or a digital filter parameter value.

In a conventional hard disk drive, parameter changes for a retry operation are made according to pre-established rules. For example, the parameter change rules are determined as described below. For a first retry operation, the first parameter is changed by a specified amount. For a second retry operation, the second parameter is changed by a specified amount. To reduce the number of retry operations, a conventional, typical recovery procedure uses statistical data.

In an assurance test for an outgoing inspection, for example, a retry operation is repeated while all the parameter values are varied to acquire statistical data about the retry count. When retry conditions under which an accurate read operation is performed with a statistically high probability are used initially for recovery procedure execution purposes, it can be expected that the retry count may be decreased to a certain extent. However, the optimum read conditions vary with the write conditions for a data write into the target sector. Therefore, it is difficult for the above retry control, which is based on statistical data, to produce a satisfactory effect.

If, on the other hand, the recovery procedure concludes that a target sector is defective, the data in that sector is rewritten in a spare area of the magnetic disk. The spare area has a plurality of spare sectors for storing user data in place of a defective user sector. A defective sector is reassigned to one spare sector. Spare sector management is exercised by referencing a management table, which is called a defect map.

Various data registration methods are proposed for the use of a defect map (refer, for instance, to Japanese Patent Laid-open No. 2002-268829. Typically, the defect map has data that associates defective sector numbers with spare sector numbers. In a process, for instance, for generating CHS numbers (cylinder number, head number, and sector number), which constitute the parameter information for specifying a sector position from a logical address for a data read, firmware references the defect map so that a logical address corresponding to a defective sector is converted to a corresponding spare address. A spare sector can then be accessed using the logical address corresponding to the defective sector.

If a predetermined retry count is exceeded for data read purposes, the target sector is generally classified as defective so that a spare process is performed. However, spare sectors are formed in an area different from an area for normal user sectors. Therefore, spare sectors are accessed with a delay so as to lower the read/write transfer rate of the hard disk drive. This may result, for instance, in a decrease in the data read speed and deterioration in display quality for motion picture playback.

If a retry operation needs to be repeated multiple times due to incompletely recorded data, the problem may be attributable to a defect in the employed medium or data write conditions such as the temperature and head position for a data write. If the problem is caused by such data write conditions and not caused by the employed medium, spare sectors, which are held in reserve for a specific purpose, are used by an unnecessary spare process although the medium itself has no problem at all.

BRIEF SUMMARY OF THE INVENTION

It is therefore a feature of the present invention to reduce the unnecessary recording area consumption. Another feature of this invention is to provide efficient control over a data recording/reproducing apparatus. Yet another object of the invention is to exercise effective control over a data recording/reproducing apparatus in accordance with write conditions. A still further feature of the invention is to minimize the decrease in the data read speed.

In a first aspect of the present invention, a media drive for driving a medium on which data is recorded comprises a recording condition data generator for generating recording condition data, which indicates the conditions for a write onto the medium during a write process; an interface for acquiring user data; a write data generator for generating write data to be written onto the medium in accordance with the recording condition data and user data; and a head for writing the generated write data onto the medium. The media drive can therefore be controlled using the write conditions for a write process.

In some embodiments, the media drive further comprise a temperature detector for detecting the temperature, and the recording condition data include temperature-related information detected by the temperature detector. The media drive can then be controlled using the temperature information about a write process.

In other embodiments, the media drive further comprise a head position detector for detecting the position of the head, and the recording condition data include the positional information about the head. The media drive can then be controlled using the information about the head position in a write process. It is also desirable that the medium have a plurality of tracks for recording data, and that the recording condition data include the information about the positional displacement of the head from the tracks. The media drive can then be controlled in accordance with the positional displacement from a track.

In specific embodiments, the head records data onto the medium by allowing a write current to flow to a coil, and the recording condition data includes the information about the write current. The media drive can then be controlled in accordance with the write current.

The media drive desirably further comprises a recording condition data acquisition section for acquiring recording condition data, which indicates the conditions for a write onto the medium, from data read from the medium; a user data acquisition section for acquiring user data from the read data; and a recovery procedure controller for controlling, in accordance with the recording condition data, a recovery procedure for the user data that is performed if data cannot accurately be read from the medium. The recovery procedure can then be controlled more effectively in accordance with user data write conditions.

In a second aspect of the present invention, a media drive for replaying data recorded on a medium and performing, if the data cannot accurately be read from the medium, a recovery procedure which additionally performs a re-read process comprises a head for reading recorded data from the medium; a recording condition data acquisition section for acquiring recording condition data, which indicates the conditions for a write onto the medium, from the read data; a user data acquisition section for acquiring user data from the read data; and a recovery procedure controller for controlling a recovery procedure for the user data in accordance with the recording condition data. The recovery procedure can then be controlled more effectively in accordance with user data write conditions.

In some embodiments, it is preferred that the medium have a spare area, which alternatively stores data if a storage area is found defective, and that the controller determine whether or not to record the user data in the spare area in accordance with the recording condition data. The spare area can then be efficiently used. Alternatively, it is preferred that the controller determine according to the recording condition data whether a storage area where the user data is stored is defective. The storage area can then be more effectively checked for defects. Further, it is preferred that the user data be rewritten in the same storage area if the storage area where the user data is stored is found nondefective. This ensures that the data can be properly stored while avoiding unnecessary storage area consumption.

In specific embodiments, the recording condition data includes the temperature information about a write process, and the controller controls the recovery procedure for the user data in accordance with the temperature information. The temperature-based recovery procedure can then be effectively controlled. Further, it is desirable that if the temperature during a write process is not higher than predetermined, the controller determine that the storage area where the user data is stored is not defective. This ensures that the storage area can be correctly checked for defects in situations where the recovery procedure needs to be performed due to a low temperature although the medium is nondefective.

In some embodiments, it is preferred that the recording condition data include the positional information about the write head in a write process, and that the controller control the recovery procedure for the user data in accordance with the positional information. The head-position-based recovery procedure can then be effectively controlled. Alternatively, it is preferred in the above second aspect that the medium have a plurality of tracks for data recording, and that the recording condition data include the information about the positional displacement of the write head from the tracks in a write process, and further that if the positional displacement in a write process is not smaller than predetermined, the controller conclude that the storage area where the user data is stored is nondefective. This ensures that the storage area can be correctly checked for defects in situations where the recovery procedure needs to be performed due to head position displacement although the medium is nondefective.

In a third aspect of the present invention, a media drive for driving a medium on which data is recorded comprises a medium containing a plurality of sectors for storing data; a head for reading recorded data from a first sector of the medium; a recording condition data acquisition section for acquiring from the read data the recording condition data that includes the information about the head position in a process for a write into the first sector; and a head position controller for controlling the head position during a process for reading a second sector in accordance with the positional information about the first sector. This ensures that the head position can be effectively controlled during a read process.

In some embodiments, it is desirable that the positional information about the first sector include the information about the positional displacement from the tracks, and that the controller control the head position during a read process for the second sector in accordance with the positional displacement of the first sector. This minimizes the possibility of incurring a data read error in an off-track situation.

In a fourth aspect of the present invention, a processing method for recording data onto a medium comprises acquiring the user data to be recorded onto the medium; generating recording condition data that indicates the conditions for a write onto the medium; and generating the write data to be written onto the medium in accordance with the recording condition data and user data. This ensures that the media drive can be controlled using the write conditions for a write process.

In a fifth aspect of the present invention, a processing method for data read from a medium comprises reading data from the medium; acquiring recording condition data, which indicates the conditions for a write onto the medium, from data read from the medium; acquiring user data from data from the read data; and controlling, in accordance with the recording condition data, a recovery procedure for the user data that is performed if the user data cannot accurately be read from the medium. This ensures that the recovery procedure can be controlled effectively according to the write conditions.

In a sixth aspect of the present invention, a method for controlling a process for reading data from a medium comprises reading recorded data from a first sector of a medium that contains a plurality of data storage sectors; acquiring from the read data the recording condition data that includes the information about the head position in a process for a write into the first sector, and controlling the head position in a process for reading a second sector in accordance with the positional information about the first sector. This ensures that the head position can be controlled effectively during a read process.

Embodiments of the present invention ensure that a media drive for driving a medium on which data is recorded can be controlled effectively according to data write conditions.

DETAILED DESCRIPTION OF THE INVENTION

Possible embodiments of the present invention will now be described. The description of the embodiments invention is given for explanation purposes. It must be recognized that the present invention is not intended to be limited only to the embodiments described below. For clarification of the explanation, the following description and the accompanying drawings are shortened or simplified as appropriate. Those skilled in the art will appreciate that changes, additions, and conversions can be readily applied to the elements of the following embodiments without departure from the scope and spirit of the present invention.

Figure 1:
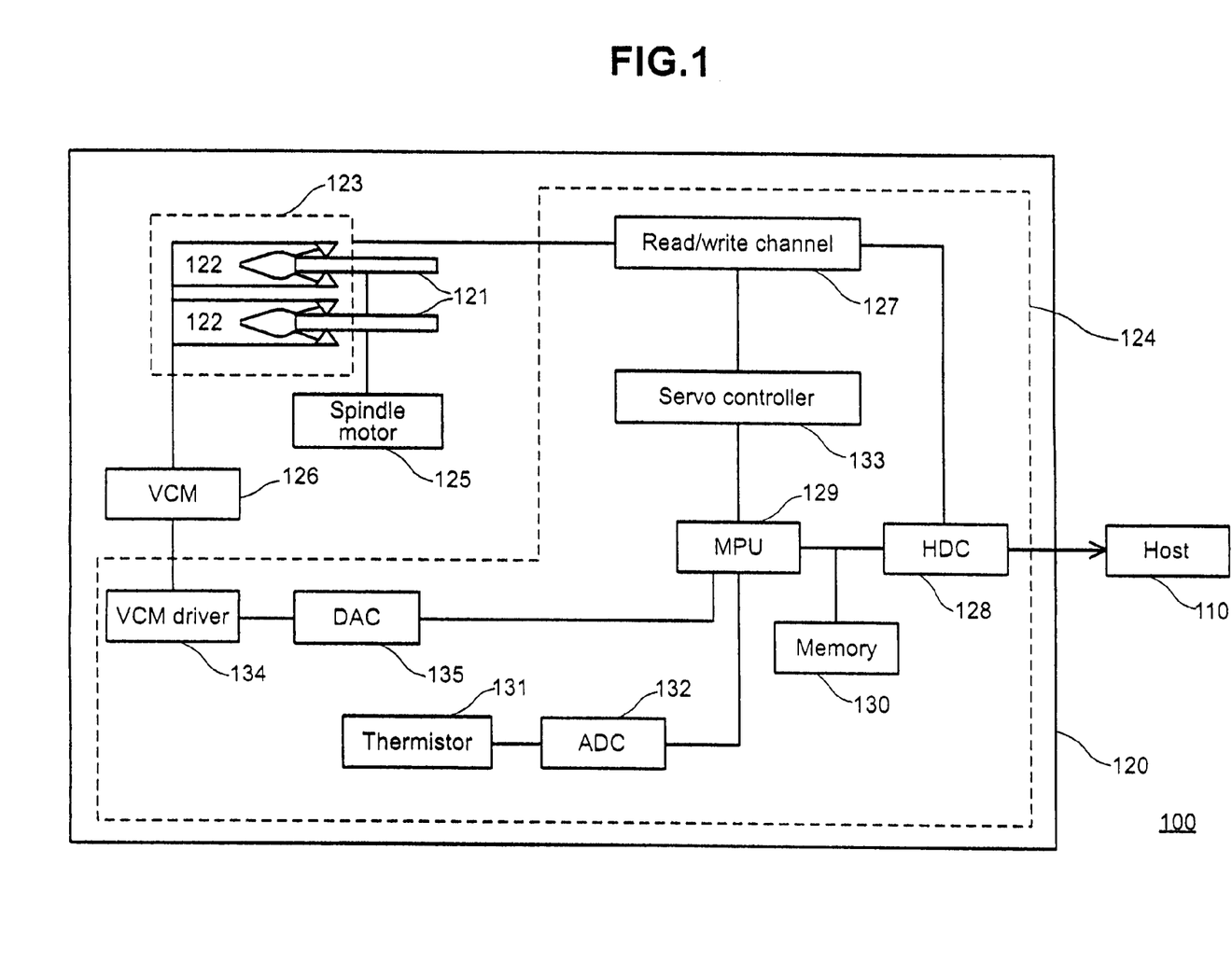
FIG. 1 is a block diagram that illustrates the hardware configuration of one embodiment of a data processing system.

FIG. 1 is a schematic diagram that illustrates the configuration of one embodiment of a data processing system 100. The data processing system 100 includes a host 110, which is a computer, digital camera, or other data processing device, and a hard disk drive 120, which is a data recording/reproducing apparatus for storing data transmitted from the host 110. The hard disk drive 120 includes, within its frame, one or more magnetic disks 121, a head stack assembly 123 having a magnetic head 122 for a recording surface of each magnetic disk, and a controller 124 for controlling the above elements in order to write data onto a magnetic disk 121 and read data from a magnetic disk 121.

Host user data, which is transmitted from the host 110, is processed as needed by the controller 124, converted to a write signal, and forwarded to the head stack assembly 123. The magnetic head 122 writes data onto a recording surface of the magnetic disk 121 in accordance with an acquired write signal. Meanwhile, a read signal, which is read from the magnetic disk by the magnetic head 122, is converted to a digital signal and processed as needed by the controller 124, and then transmitted to the host 110.

The magnetic disk 121 is a nonvolatile recording medium that records data by magnetizing a magnetic layer. While the hard disk drive 120 is operating, the magnetic disk 121 is driven to rotate at a constant speed around a spindle axis of a spindle motor 125. While the hard disk drive 120 is not operating, the magnetic disk 121 is at a standstill. A plurality of concentric tracks are formed on a surface of the magnetic disk 121 to provide a data storage area. Each track is circumferentially divided into a plurality of sectors.

A servo data storage area is formed on the surface of the magnetic disk 121. Typically, the magnetic disk 121 has a plurality of radially formed, servo data storage areas. Each sector is provided with a servo data storage area and a user data storage area. When the magnetic head 122 reads servo data, the positional information about the magnetic head 122 is obtained. The servo data includes track data, which contains track number information, sector data, which contains sector number information, and a burst pattern.

The head stack assembly 123 is mounted within the frame in such a manner that it can oscillate along the surface of the magnetic disk 121. A voice coil motor (VCM) 126 is used to drive the head stack assembly 123. A magnetic head 122, which includes a slider and a magnetic thin-film device, is mounted at an end of the head stack assembly. When the head stack assembly 123 oscillates, the magnetic head 122 moves radially over the surface of the magnetic disk 121. This enables the magnetic head 122 to access a target track.

The head stack assembly 123 has two magnetic heads 122 for each magnetic disk 121. The two magnetic heads correspond to the front or back surface of a magnetic disk 121. While no data write/data read process is performed, the magnetic heads 122 are typically parked on a ramp mechanism (not shown), which is provided outside the magnetic disk 121. If a CSS (Contact Start and Stop) method is employed, the magnetic heads 122 are parked within a CSS zone, which is provided within an inner circular area. The magnetic heads 122 write data onto the magnetic disk 121 or read servo data and user data from the magnetic disk 121.

As shown in FIG. 1, the controller 124 includes a read/write channel 127, a hard disk controller (HDC) 128, a microprocessor unit (MPU) 129, a memory 130, a thermistor 131 for temperature detection, an AD converter (ADC) 132 for converting an analog signal input from the thermistor 131 to a digital equivalent, a servo controller 133, a voice coil motor driver (VCM driver) 134, and a DA converter (DAC) 135 for converting the control data for the voice coil motor driver 134 into an analog equivalent.

The read/write channel 127 performs a write process on the data acquired from the host 110. In the write process, the read/write channel receives write data from the hard disk controller 128, subjects the received write data to code modulation, converts the code-modulated write data to a write signal (current), and supplies it to a magnetic head 122. The magnetic head 122 writes data onto a magnetic disk 121 by allowing a current to flow to the coil in accordance with the acquired signal. When data is to be supplied to the host 110, a read process is performed. In the read process, the read/write channel 127 receives a read signal from the magnetic head 121, extracts data from the received read signal, and performs a decoding process. The resulting decoded read data is then supplied to the hard disk controller 128.

The MPU 129 operates in accordance with firmware, which is loaded into the memory 130, to exercise overall control over the hard disk drive 120, including magnetic head positioning control, interface control, and defect management, and perform processes necessary for data processing. When the hard disk drive 120 starts up, the firmware running on the MPU 129 and the data required for control and data processing are loaded into the memory 130 from a magnetic disk 121 or a ROM (not shown).

Digital data read by the read/write channel 127 includes servo data as well as the user data supplied from the host 110. The servo controller 133 extracts the servo data from the read data acquired from the read/write channel 127. The servo data includes track data, sector data, and burst pattern. The extracted servo data is transferred from the servo controller 133 to the MPU 129. The MPU 129 uses the servo data to perform a positioning control process for a magnetic head 122 in accordance with the firmware. Control data supplied from the MPU 129 is converted to an analog control signal by the DA converter 135 and then transferred out to the VCM driver 134. The VCM driver 134 supplies a drive current to the VCM 126 in compliance with the analog control signal.

The thermistor 131, which is an example of a temperature detector, generates a temperature signal in accordance with a detected temperature. The resulting analog temperature signal is converted to digital temperature data by the AD converter 132 and used for a firmware process of the MPU 129. The resulting temperature data is not only used to control the amount of a current flow to the coil during a process for a write onto a magnetic disk 121 by a magnetic head 122, but also used as write condition data for a data write process in the present embodiment and stored on the magnetic disk 121 together with the user data. The use of the temperature data will be described in detail later.

The hard disk controller 128 functions as an interface with the host 110 and receives user data and various commands such as a read command and write command from the host 110. The received user data is transferred to the read/write channel 127. Further, the read data derived from a magnetic disk is acquired from the read/write channel 127 and transmitted to the host 110. The hard disk controller 128 also subjects the user data acquired from the host 110 to a code generation process for error correction (ECC). In addition, the hard disk controller 128 performs an error correction process on the data read from a magnetic disk 121.

Figure 2:
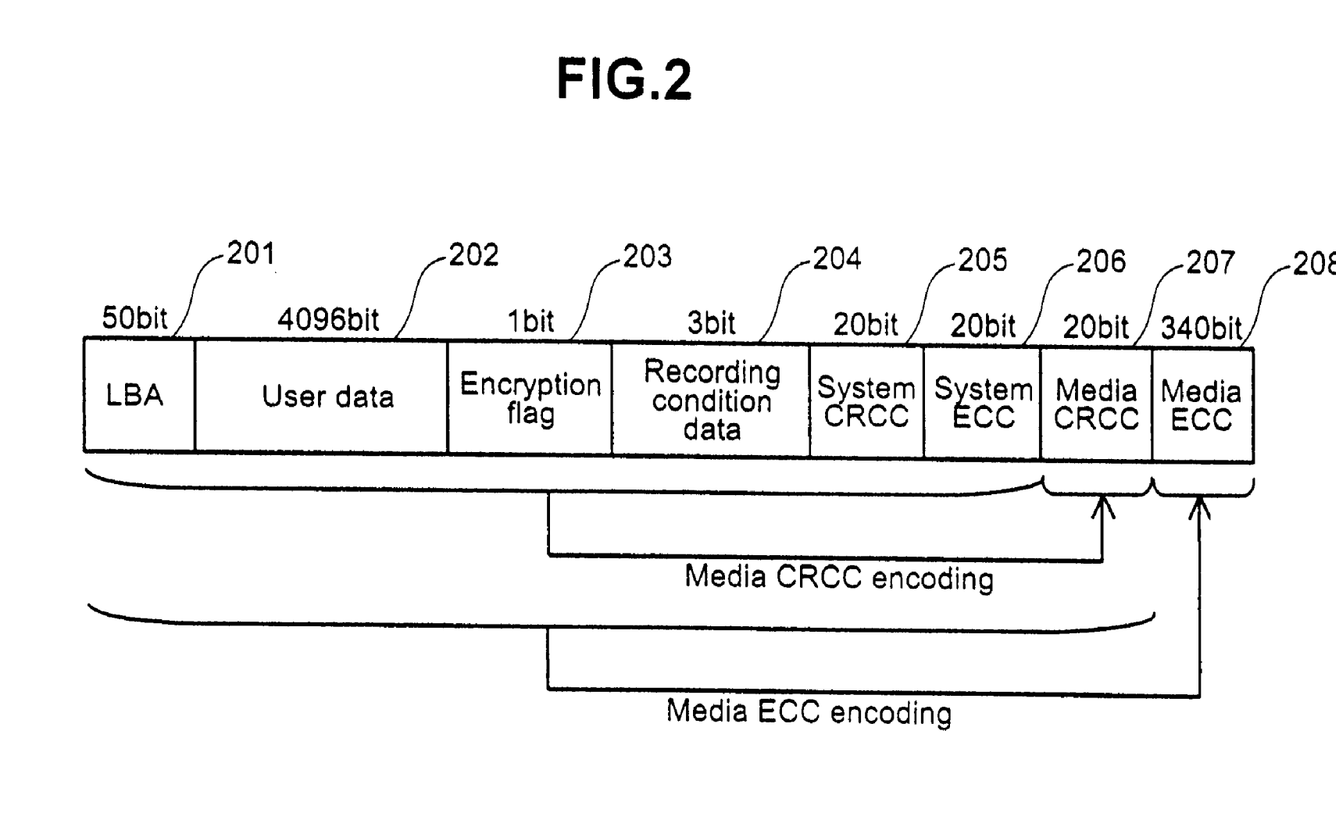
FIG. 2 illustrates a data format that is used to describe how the embodiment generates write data, including recording condition data.

FIG. 2 shows an example of a data format for the purpose of explaining about ECC (Error Correction Code) encoding by the controller 124. As shown in FIG. 2, ECC encoding is conducted in accordance with an LBA (Logical Block Address), which is the address data acquired from the host 110, user data 202 acquired from the host, an encryption flag 203 for indicating whether data is encrypted, and recording condition data 204, which indicates the write conditions for writing data onto a magnetic disk 121. The recording condition data 204 is generated by the controller 124. In the present embodiment, the temperature information about a data write process for a magnetic disk 121 is recorded in a field for the recording condition data 204.

In the example shown in FIG. 2, the codes to be added for error correction purposes are a system CRCC (Cyclic Redundancy Check Code) 205, a system ECC 206, a media CRCC 207, and a media ECC 208. The CRCC provides error correction verification in order to avoid erroneous detection, which may be caused by an ECC code with a low probability. Typically, Reed-Solomon codes are used for ECC/CRCC generation. The system CRCC 205 and system ECC 206 are added to provide error correction for storage in the memory 130 within the controller 124. The media CRCC 207 and media ECC 208, on the other hand, are added to provide error correction for data storage on a magnetic disk 121.

In the example shown in FIG. 2, the 20-bit system CRCC 205 and 20-bit system ECC 206 are generated from the 50-bit LBA 201, 4096-bit user data 202, 1-bit encryption flag 203, and 3-bit recording condition data 204. Further, the 20-bit media CRCC 207 and 340-bit media ECC 208 are generated from data that is obtained by adding the system CRCC 205 and system ECC 206 to the above data. The sizes of the data, including the recording condition data 204, are set as appropriate. The recording condition data 204 can be used for a process of generating the media CRCC 207 and media ECC 208 without being used for generating the system CRCC 205 and system ECC 206.

As described above, the write data to be written on a magnetic disk 121 is provided with a field for storing the write process conditions for the write data. In the present embodiment, the temperature information about a write process is recorded in the field for the recording condition data 204 and used to exercise recovery process control when a process is performed to read data from a magnetic disk 121. The recovery procedure is performed when data cannot accurately be read from a magnetic disk 121. If the recovery procedure reveals any defective sector in the user area on the magnetic disk 121, the data in the user area is moved to a spare area on the magnetic disk.

On a magnetic disk, a secondary defective sector may arise after shipment in addition to a primary defective sector, which is detected at a manufacturing stage. The magnetic disk's recording surface deteriorates with repeated information rewrites and time so that the reliability of a user sector read/write may degrade. If a read error occurs so that a read cannot be performed in a normal read mode, the hard disk drive 120 initiates a recovery procedure. The hard disk drive 120 changes the read timing, fine-tunes the head position, or otherwise modifies a read parameter and repeatedly retries a data read operation. If it is concluded that the reliability of a target sector is lower than predetermined, the hard disk drive 120 decides to use a spare sector instead of such an unreliable sector.

The spare sector is provided on the same track or another track. If the spare sector is on the same track, the magnetic head has to wait for the disk's rotation until the spare sector is reached. If, on the other hand, the spare sector is on another track, it is necessary to wait until a search track change is made by a seek operation. The mechanical operation required for such a search position change lowers the read/write transfer rate of the hard disk drive 120 so that the display quality, for instance, in motion picture playback deteriorates. In the present embodiment, the recording condition data 204 is used to prevent nondefective sectors from being erroneously classified as defective, thereby avoiding delayed access due to spare area use and preventing unnecessary spare area consumption.

Spare sector management is exercised by referencing a defect map that is stored in the memory 130. The defect map is stored on a magnetic disk. It is temporarily stored in the memory 130 while the hard disk drive 120 operates. The LBA acquired from the host 110 is converted to the CHS numbers (cylinder number, head number, and sector number), which constitute the parameter information for specifying a target sector position, by referencing the defect map stored in the memory. Conversion from the LBA to the CHS numbers can be effected by the hard disk controller in accordance, for instance, with the defect map information referenced by the firmware, which runs on the MPU 129.

The defect map is updated by the firmware running on the MPU 129. If the firmware concludes that the reliability of a specified sector is lower than prescribed, the firmware exercises control to prevent the sector from being used. More specifically, the firmware registers data in the defect map so as to designate a spare sector that corresponds to a defective sector. The technology for spare processing based on the defect map is well known in the art and is therefore not described in detail herein.

Figure 3:
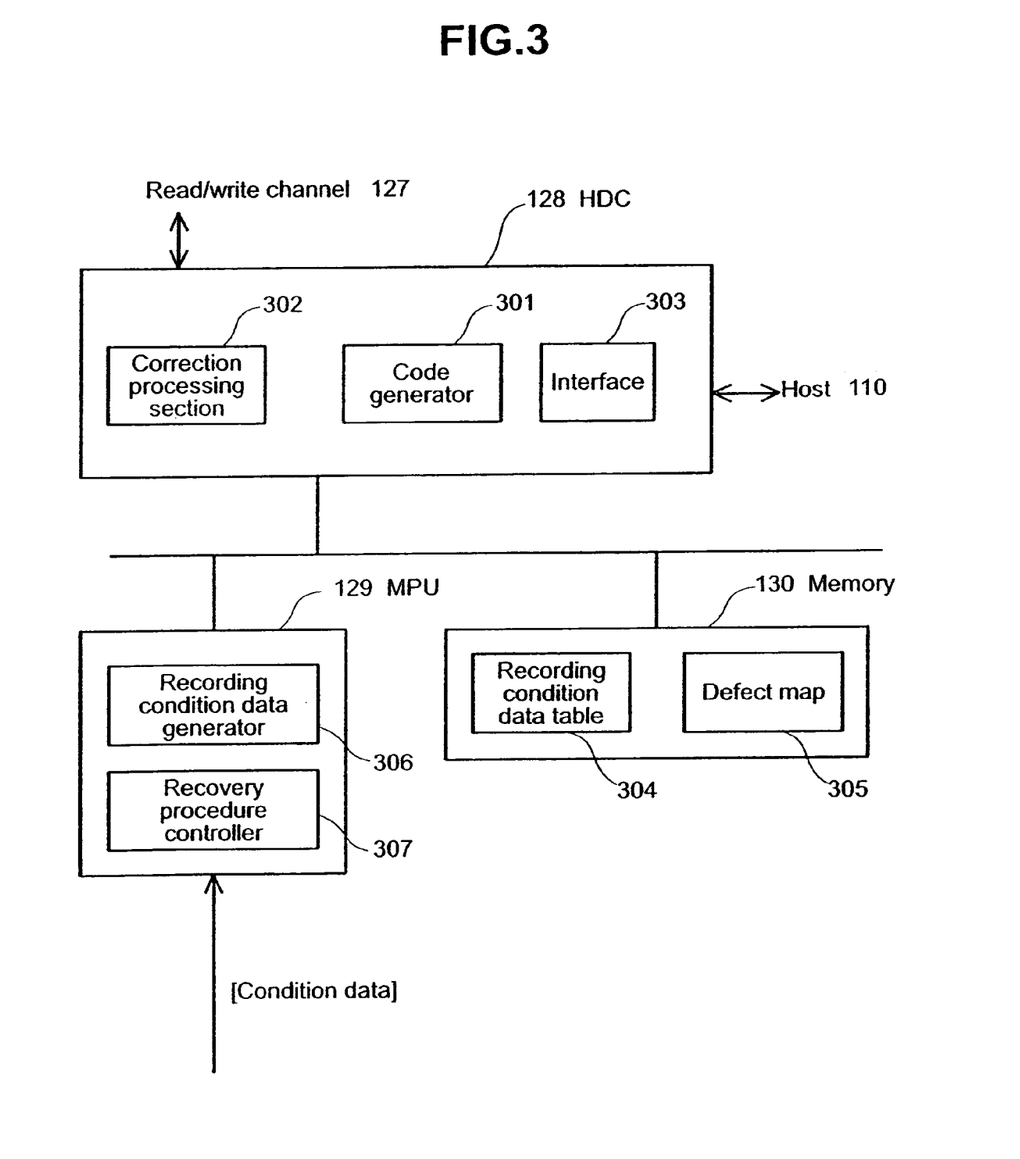
FIG. 3 is a block diagram that illustrates the logical configuration of a hard disk drive controller according to the embodiment.

The process for generating the data described with reference to FIG. 2 will now be described. FIG. 3 is a block diagram illustrating the logical configuration of a process for generating the data to be written onto a magnetic disk from the data acquired from the host 110. Data generation is performed by the hard disk controller 128, the firmware running on the MPU 129, and a table stored in the memory 130. As shown in FIG. 3, the hard disk controller 128 comprises a code generator 301 for generating error correction codes (CRCC and ECC) and a correction processing section 302 for performing an error correction process on the data read from a magnetic disk 121. One or more modes can be furnished for the error correction process. The hard disk drive 120 can be configured so as to perform the error correction process in coordination with the firmware running on the MPU 129 or within the correction processing section 302. The reference numeral 303 denotes an interface that performs a data transmission process in relation to the host 110.

Figure 4:
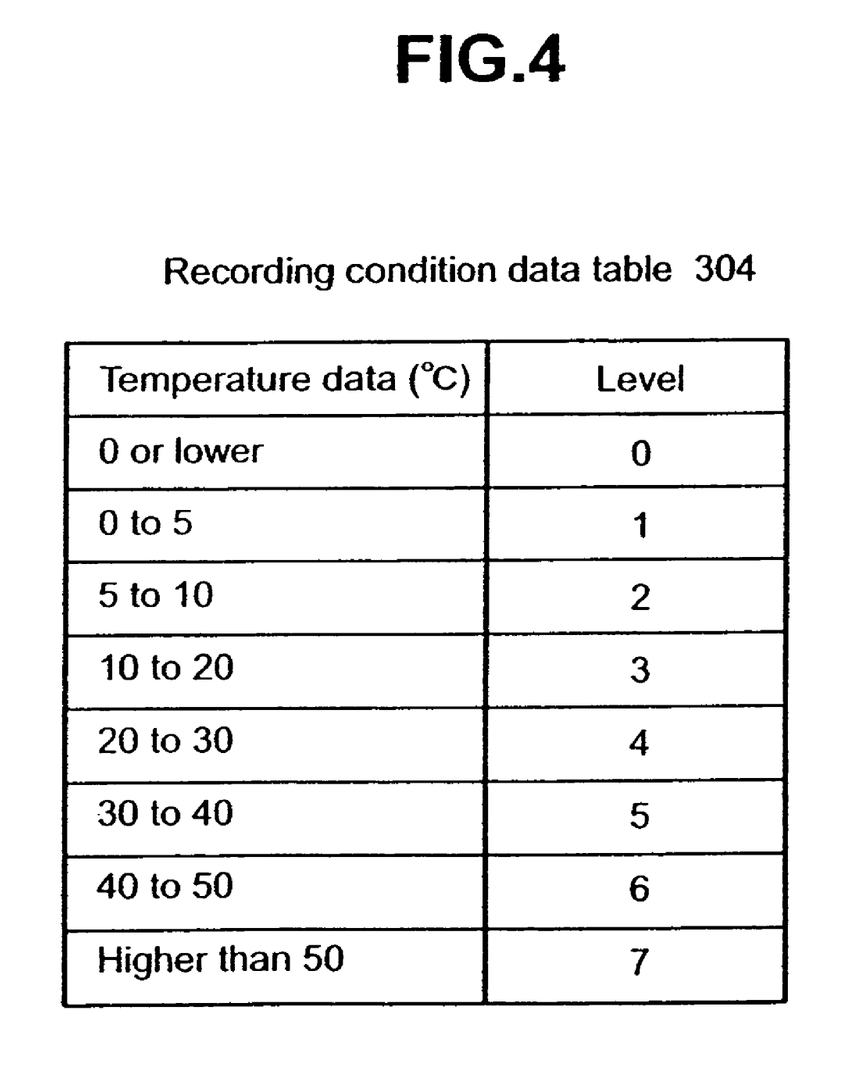
FIG. 4 illustrates the structure a recording condition data table according to the embodiment.

The memory stores a recording condition data table 304, which defines the association between the temperature data derived from the thermistor 131 and the recording condition data 204 to be added to the write data. The temperature data is classified into a plurality of groups according to the temperature level so that temperature information can be written with a limited number of bits. FIG. 4 shows a configuration example of the table 304. In the example shown in FIG. 4, the temperature data is classified into eight different levels (corresponding to three bits). A specific temperature classification method is selected as appropriate at an apparatus design stage.

When the MPU 129 operates according to the firmware, it can function as a recording condition data generator 306 or a recovery procedure controller 307. The recording condition data generator 306 generates recording condition data 204 in accordance with the temperature data acquired from the thermistor 131. The recovery procedure controller 307 controls a recovery procedure when a process is performed to read a magnetic disk 121. The recovery procedure controller 307 will be described in detail later.

Figure 5:
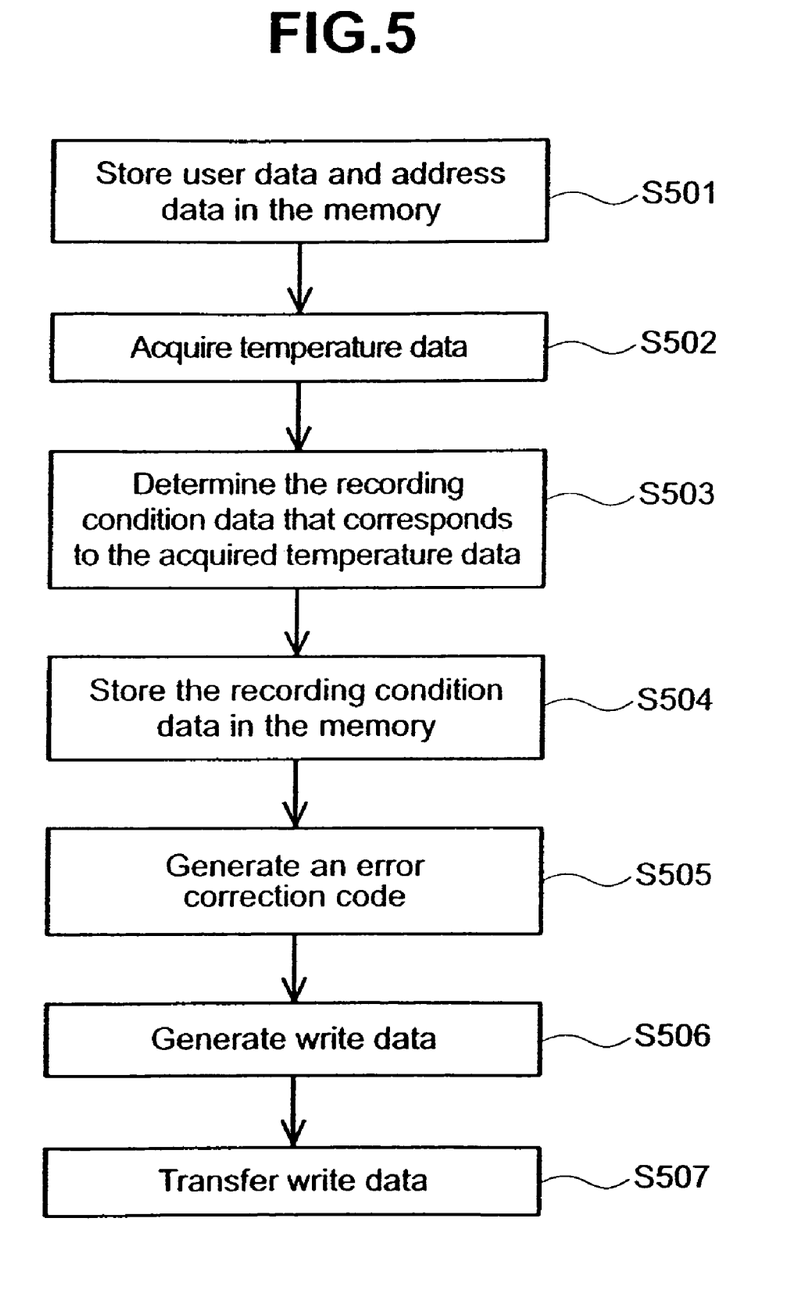
FIG. 5 is a flowchart illustrating an ECC process for write data.

The ECC process for write data will now be described with reference to a flowchart in FIG. 5. User data 202 and address data 201, which are acquired together with a command from the host 110 via the interface 303, are stored in the memory 130 (step S501). The recording condition data generator 306 acquires temperature in accordance with the temperature detected by the thermistor 131 (step S502). Further, the recording condition data generator 306 references the recording condition data table 304, which is stored in the memory 130, decides on the recording condition data 204 that corresponds to the acquired temperature data (step S503), and stores such data in the memory 130 (step S504).

The code generator 301, which is an example of the write data generator, acquires user data 202, address data 201, and recording condition data 204 from the memory 130, and then generates the system CRCC 205, system ECC 206, media CRCC 207, and media ECC 208 from the above data and the encryption flag 203 (step S505). The encryption flag 203, recording condition data 204, and generated error correction codes are added to the user data 202 to generate write data (step S506). The write data is transferred from the hard disk controller 128 to the read/write channel 127 (step S507).

Next, a read data process will now be described. The read data acquired from the read/write channel 127 is subjected to an error correction process, which is performed by the correction processing section 302. The correction processing section 302 checks whether the read data is in error. If the read data is in error, the correction processing section 302 calculates error data, which comprises an error location and error pattern, and then uses the CRCC to verify that the calculated error data is entirely correct. If the calculated error data is correct, the correction processing section 302 corrects the above read data in accordance with the above error data. The user data corrected in this manner is transferred to the host 110 via the interface 303.

If the data cannot accurately be read from a magnetic disk 121, the recovery procedure is executed to retry a data read process. The recovery procedure controller 307 changes a read parameter and requests the relevant sections to retry the data read process. If the data can be accurately read due to a read parameter change, the recovery procedure controller 307 updates the defect map 305 as needed. If, for instance, the predetermined retry count is exceeded when the data is successfully read, the recovery procedure controller 307 concludes that the reliability of the associated sector is low, and then controls the relevant sections to perform a spare process. The data read in the spare process is reassigned to a spare sector, and the contents of the defect map 305 are updated.

In the present embodiment, the recovery procedure controller 307 references the recording condition data 204 when it determines the sector reliability. If the temperature is low when data is written onto a magnetic disk 121, a larger current flows to the coil of a magnetic head 122 than when the temperature is normal. In some cases, however, a smaller degree of magnetism may be recorded on the magnetic disk 121 than when the temperature is normal. As a result, a read operation might have to be retried multiple times because a normal read process may fail to read a signal magnetic field generated by the magnetic disk 121. In such a case, there is a problem with the write conditions and the target sector is defective. Therefore, when the read data is rewritten into the target sector, subsequent data read operations can be performed normally.

Figure 6:
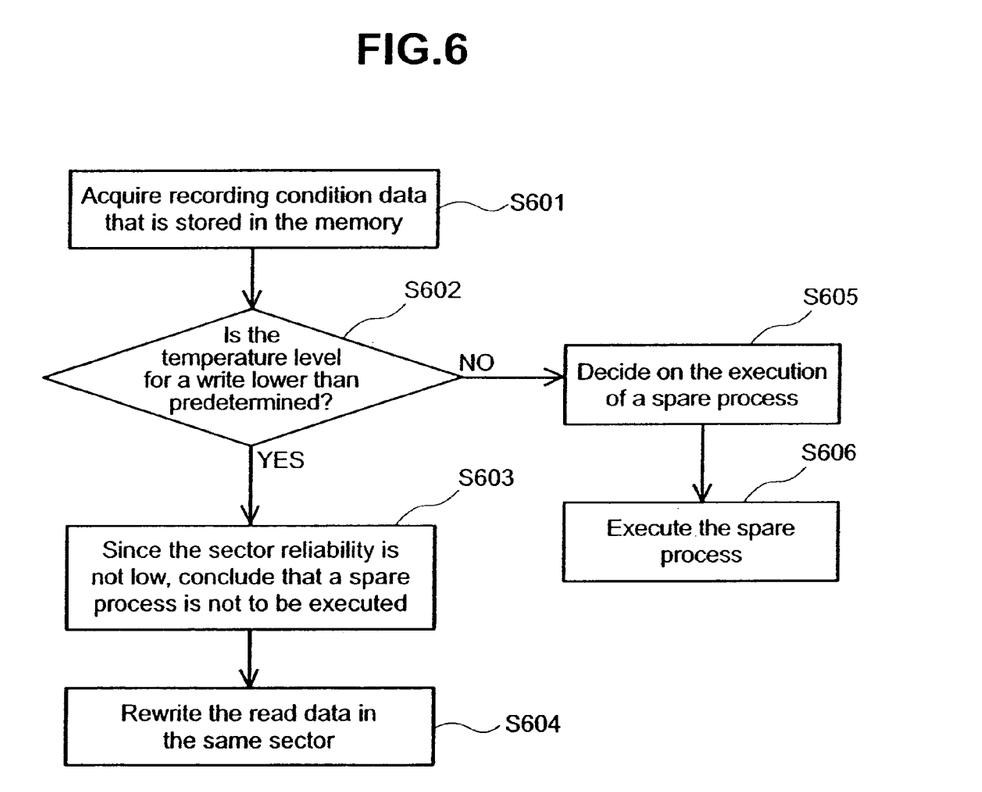
FIG. 6 is a flowchart that illustrates how a recovery procedure controller performs a sector reliability determination process.

A sector reliability determination process performed by the recovery procedure controller 307 will now be described with reference to a flowchart in FIG. 6. The recovery procedure controller 307 acquires recording condition data 204 that is stored in the memory 130 by the hard disk controller 128 (step S601). The recording condition data 204 is referenced to check whether the temperature prevalent during a write is lower than predetermined. In the present embodiment, the check is conducted to determine whether the temperature level prevalent during a write is lower than specified in the table (step S602). If the temperature level prevalent during a write is lower than predetermined, it is concluded that the sector's reliability is not low, and that the spare process is not to be performed (step S603). The read data is then rewritten into the same sector (step S604). If, on the other hand, the temperature level prevalent during a write is higher than predetermined, it is concluded that the spare process is to be performed (step S605), and then the spare process is performed in accordance with such a conclusion (step S606).

When the read sector reliability is to be determined in the recovery process as described above, the sector reliability can be determined with increased accuracy by referencing the recording condition data 204, which is stored on a magnetic disk 121 with its association with the user data 202 defined. This makes it possible to minimize the amount of unnecessary spare area use and prevent the storage area from being wasted or avoid an increase in the access time, which may result from unnecessary spare area use. When a hard disk drive is used as a removable memory, the recording condition data 204 for the present embodiment is especially useful because it is anticipated that the temperature considerably changes depending on the aspect of hard disk drive use.

The detection of the write conditions for recording condition data generation is timed as appropriate at a design stage. In the present embodiment, for instance, the temperature can be detected at a predetermined time after the hard disk drive is turned ON, at a predetermined time when a magnetic head is loaded over a magnetic disk, or at a predetermined time after a write, read, or other command is received from the host. Preferably, temperature detection is achieved when a write data generation process is performed. For example, the temperature detected by the thermistor or the write current level of a magnetic head 122 can be used as the temperature information to be stored in the field for the recording condition data 204. The write current, which flows to the coil of the magnetic head 122, is selected from a plurality of levels that correspond to temperature levels during a write. Therefore, the information about the temperature during a write can be acquired by referencing the write current level. If the number of write current levels is greater than the number of levels that can be stored as the recording condition data 204, the write current levels can be classified into groups the number of which is not greater than the number of levels that can be stored. In the present embodiment, the magnetic head 122 is a record/replay head that performs a write/read process. However, the present invention is also applicable to a record-only device, which has a head that merely records information or a replay-only device, which merely replays information. Although the present information is useful for magnetic disk drives, it can also be applied to an optical disk drive and other types of media drives that drive media. This holds true for the subsequent description as well.

Another embodiment of the recording condition data 204 will now be described. In the present embodiment, the recording condition data 204 includes the positional information about a magnetic head 122 in a write process for a magnetic disk 121. A preferable item of positional information is the amount of positional displacement of the magnetic head 122 from a track. When the amount of positional displacement from a target track is referenced at the time of a data write, for example, the read sector reliability for the recovery process can be enhanced.

The burst pattern included in the servo data is used to calculate the amount of positional displacement of the magnetic head 122 from a track. First of all, servo control will be briefly described with reference to FIG. 1. The servo controller 133, which is an example of the head position detector, extracts the servo data from the read data acquired from the read/write channel 127. The extracted servo data is transferred from the servo controller 133 to the MPU 129 to provide positional control of the magnetic head 122. The MPU 129 complies with the firmware and performs a positioning control process in accordance with the information about the current magnetic head position, which is obtained from the servo controller 133, and the information about the target position. For efficient positioning control, some speed control or position control modes are rendered available. The technology for positioning control is well known in the art and is therefore not described in detail herein.

The burst pattern included in the servo data is used to exercise positioning control so that the magnetic head 122 traces a target track. The burst pattern comprises a plurality of servo bursts, which are arranged in the circumferential direction of a track. The servo bursts are radially positioned at predetermined spacing intervals so that the servo burst-to-track distance in the radial direction varies from one servo burst to another. When the amplitudes of the servo bursts are compared, the amount of positional displacement from a track can be calculated. Magnetic head positional control is exercised so that the amount of positional displacement does not exceed a predetermined value.

As described above, the MPU 129 can calculate the amount of positional displacement from the burst pattern acquired from the servo controller. The positional displacement includes the information about the direction of radial displacement. The process for generating the recording condition data 204 concerning the positional information about a magnetic head 122 will now be described with reference to FIGS. 3 and 7. The recording condition data generator 306 acquires servo data from the servo controller (step S701). Further, the recording condition data generator 306 references the recording condition data table 304 stored in the memory 130 to determine the recording condition data 204 for the acquired servo data (step S702), and then stores the recording condition data 204 in the memory 130 (step S703).

Figure 7:
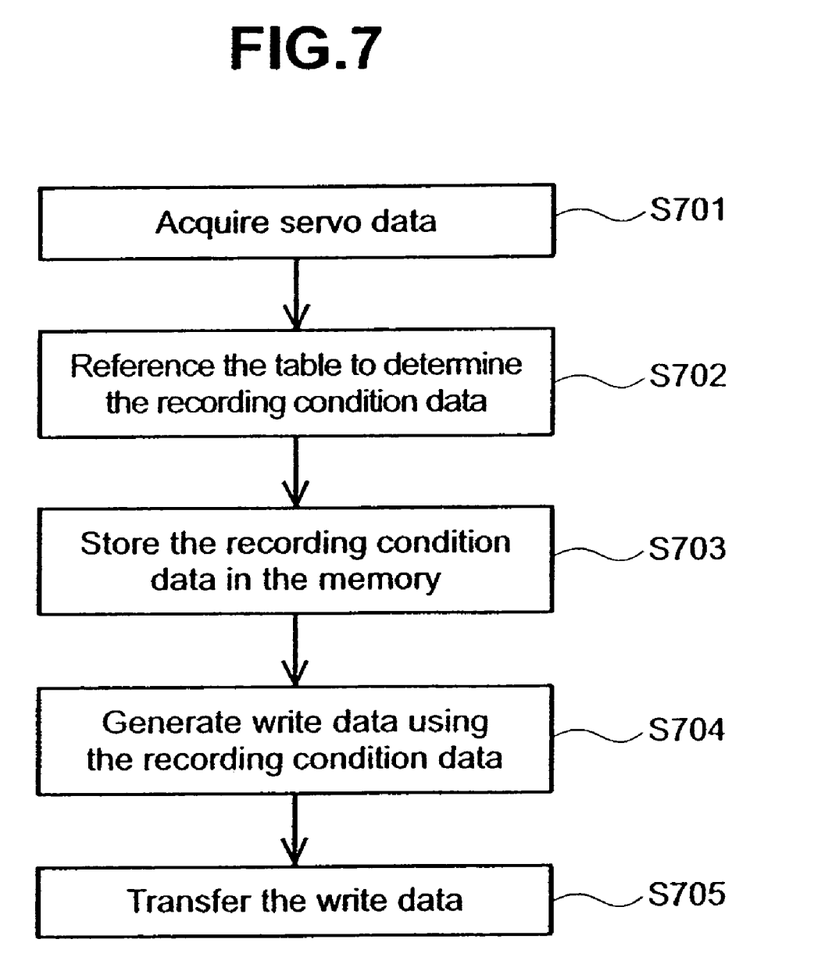
FIG. 7 is a flowchart that illustrates a process for generating recording condition data concerning the positional information about a magnetic head.

As is the case with the temperature data, the memory 130 stores a table that defines the association between the calculated amount of positional displacement and the recording condition data 204 to be added to write data. Since the amount of positional displacement including the information about the direction of displacement from a track is classified into a plurality of groups according to the positional displacement level, the positional displacement information can be written with a limited number of bits. The amount of positional displacement can be classified, for instance, into eight different levels (corresponding to three bits) depending on its absolute value. For example, the positional displacement having a small absolute value is associated with a low level. A specific positional displacement classification method is selected as appropriate at an apparatus design stage. The code generator 301 generates CRCC and ECC error correction codes, for instance, from the recording condition data 204 and user data 202 to generate write data (step S704). The write data is transferred from the hard disk controller 128 to the read/write channel 127 (step S705).

Figure 8:
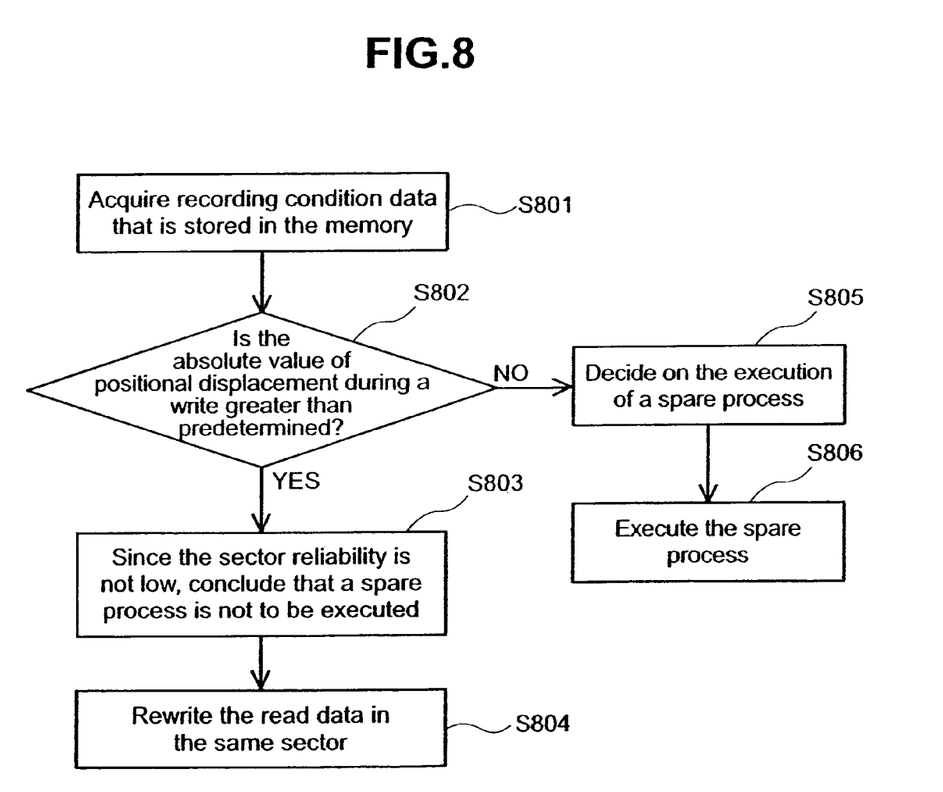
FIG. 8 is a flowchart that illustrates how a recovery procedure controller performs a sector reliability determination process.

The sector reliability determination process performed by the recovery procedure controller 307 will now be described with reference to a flowchart in FIG. 8. The recovery procedure controller 307 acquires the recording condition data 204, which is stored in the memory 130 by the hard disk controller 128 (step S801). The recovery procedure controller 307 then references, for instance, the recording condition data 204 to determine whether the absolute value of positional displacement during a write is greater than predetermined (step S802). If the absolute value of positional displacement during a write is greater than predetermined, it is concluded that the sector reliability is not low, and that the spare process is not to be performed (step S803). The read data is then rewritten into the same sector (step S804). If, on the other hand, the absolute value of positional displacement during a write is smaller than predetermined, it is concluded that the spare process is to be performed (step S805), and then the spare process is performed in accordance with such a conclusion (step S806).

As is the case with the temperature data, the recording condition data 204, which represents the positional information about a magnetic head 122 as described above, can be used for the sector reliability determination process during the recovery process. Since the recorded data's off-track situation is not a defect of the magnetic disk 121, it can be excluded out of the spare process to prevent the spare area from being unnecessarily used.

The recording condition data 204, which represents the positional information about a magnetic head 122, can be used for not only a data process for a sector in which it is stored, but also for a data process for another sector. If data cannot be accurately read from a specified sector as described above, a read process is retried with a read process parameter changed. For parameter change finalization for a retry operation for a specified sector, the recording condition data 204 about another sector can be used.

Figure 9:
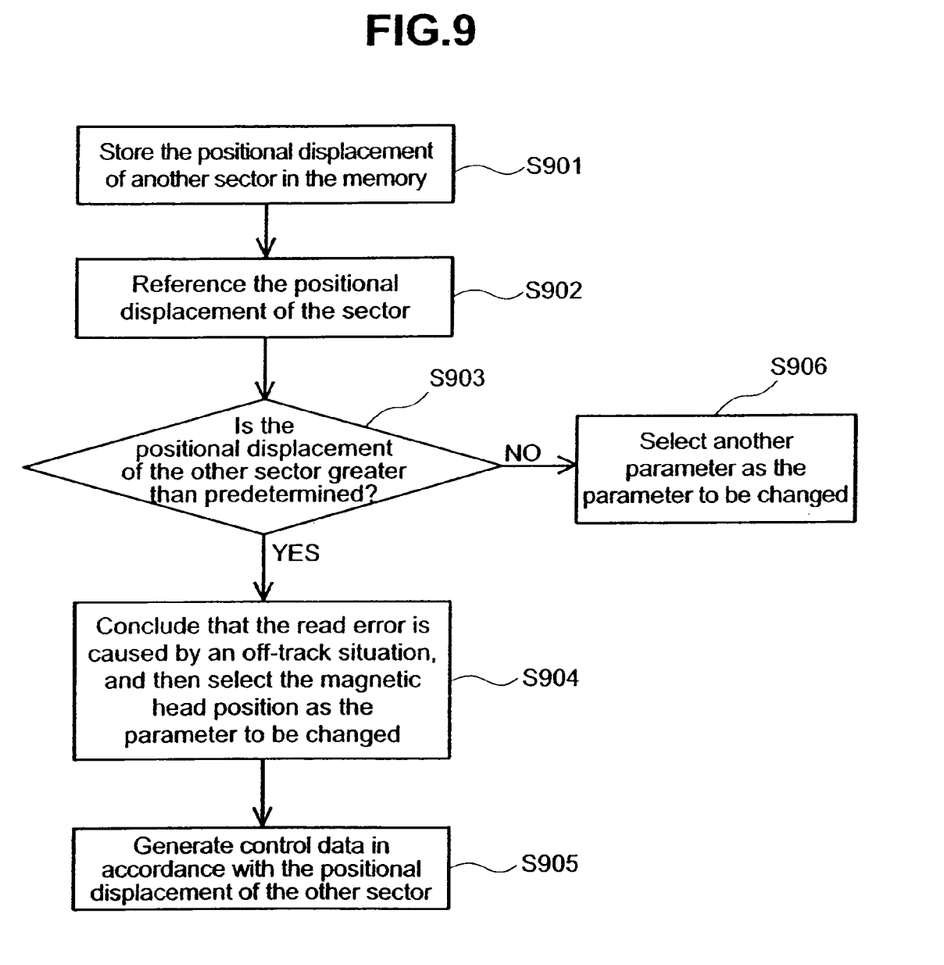
FIG. 9 is a flowchart that illustrates a process for determining the parameter to be changed for a retry operation for a specified sector by using the recording condition data about another sector.

Before a read process for a specified sector, the recovery procedure controller 307 stores, as shown in FIG. 9, the recording condition data 204 about the amount of positional displacement in the memory 130 as an example of previously obtained head position information about a write of another sector (step S901). In parameter change finalization for a specified sector retry operation, the recovery procedure controller 307 references the head position information about another sector, which is stored in the memory 130 (step S902). In a retry process for a specified sector, for instance, the recovery procedure controller 307 references the data about the positional displacement of the preceding sector that is positioned immediately before the specified sector, and determines whether the amount of positional displacement of the preceding sector is greater than predetermined (step S903).

If, for instance, the amount of positional displacement of the preceding sector is greater than predetermined, the recovery procedure controller 307 concludes that the specified sector is erroneously read due to an off-track situation, and then selects the position of the magnetic head 122 as the parameter to be changed (step S904). In a retry operation, the recovery procedure controller 307 generates control data for controlling the VCM driver 134 in accordance with the amount of positional displacement of the preceding sector (step S905). If, on the other hand, the amount of positional displacement of the preceding sector is smaller than predetermined, the recovery procedure controller 307 selects another parameter as the parameter to be changed (step S906). When the recording condition data 204 is used for determining the parameter to be changed for a retry operation as described above, the number of retries for the recovery process can be reduced to expedite an accurate data read operation. As the head position information about another sector, the head position information about a plurality of preceding sectors or a sector subsequent to the specified sector can be referenced.

In addition to the above, the recording condition data 204 representing the head position information can be used in magnetic head position control for a data read process in the normal mode. The MPU 129, which operates in compliance with the firmware to function as a servo controller, references the head position information about another sector, which is stored in the memory 130 beforehand, and exercises positional control over the magnetic head 122 during a read process for the specified sector. The MPU 129 calculates the amount of positional displacement of the specified sector from the head position information about a sector that precedes or follows the specified sector, and then outputs control data to the VCM driver 134 in accordance with the calculated amount of positional displacement. This ensures that the process for reading data from the specified sector on the magnetic disk 121 can be performed with increased dependability.

For security purposes, the recording condition data 204 can also be used to prevent data from being falsified. For example, if the recording condition data 204 is used as a timestamp, the information about data rewrite time can be obtained. Further, the recording condition data 204 can be used as a flag that references a clock within the hard disk drive 120 to indicate whether data was written at a time not earlier than specified. This makes it easy to check whether the data is falsified.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A media drive for replaying data recorded on a medium and performing, if the data cannot accurately be read from said medium, a recovery procedure that additionally performs a re-read process, the media drive comprising:
   a head configured to read recorded data from said medium;
   a recording condition data acquisition section configured to acquire recording condition data, which indicates conditions for a write onto said medium, from said read data;
   a user data acquisition section configured to acquire user data from said read data; and
   a recovery procedure controller configured to control a recovery procedure for said user data in accordance with said recording condition data;
   wherein said recording condition data includes the positional information about a write head in a write process, and wherein said recovery procedure controller is configured to control a recovery procedure for said user data in accordance with said positional information.

2. The media drive according to claim 1, wherein said medium has a spare area for recording data alternatively if a storage area is found to be defective, and wherein said recovery procedure controller is configured to determine, according to said recording condition data, whether or not to record said user data into said spare area.

3. The media drive according to claim 1, wherein said recovery procedure controller is configured to determine, according to said recording condition data, whether a storage area where said user data is recorded is defective.

4. The media drive according to claim 3, wherein said recovery procedure controller is configured to determine if a storage area where said user data is recorded is found to be nondefective, and said media drive is configured to rewrite said user data in the same storage area if said storage area is found to be nondefective.

5. The media drive according to claim 1, wherein said medium has a plurality of tracks for recording data, wherein said recording condition data includes the information about the positional displacement of a write head from the tracks in a write process, and wherein said recovery procedure controller is configured to conclude, if said positional displacement in a write process is not smaller than predetermined, that a storage area where said user data is recorded is nondefective.

6. A media drive for replaying data recorded on a medium and performing, if the data cannot accurately be read from said medium, a recovery procedure that additionally performs a re-read process, the media drive comprising:
   a head configured to read recorded data from said medium;
   a recording condition data acquisition section configured to acquire recording condition data, which indicates conditions for a write onto said medium, from said read data;
   a user data acquisition section configured to acquire user data from said read data; and
   a recovery procedure controller configured to control a recovery procedure for said user data in accordance with said recording condition data;
   wherein said recording condition data includes temperature information about a write process, and wherein said recovery procedure controller is configured to control a recovery procedure for said user data in accordance with said temperature information.

7. The media drive according to claim 6, wherein said recovery procedure controller is configured to conclude, if the temperature for a write process is lower than predetermined, that a storage area where said user data is recorded is nondefective.

8. A processing method for data read from a medium, comprising:

reading data from said medium;

acquiring recording condition data, which indicates conditions for a write onto said medium, from data read from said medium;

acquiring user data from data from said read data; and controlling, in accordance with said recording condition data, a recovery procedure for said user data that is performed if said user data cannot accurately be read from said medium;

wherein said recording condition data includes the positional information about a write head in a write process, and wherein said recovery procedure controller controls a recovery procedure for said user data in accordance with said positional information.

* * * * *